(12) United States Patent
Wooton et al.

(10) Patent No.: US 7,294,264 B2
(45) Date of Patent: Nov. 13, 2007

(54) SPRAYER PURIFIER CARTRIDGE SYSTEM

(75) Inventors: John Allen Wooton, New Richmond, OH (US); Richard Lawrence Horstman, Cincinnati, OH (US); William Michael Cannon, West Harrison, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/713,460

(22) Filed: Nov. 14, 2003

(65) Prior Publication Data

US 2005/0103699 A1   May 19, 2005

(51) Int. Cl.
*B01D 27/08*   (2006.01)
(52) U.S. Cl. .................. 210/236; 210/251; 210/282; 210/450; 210/460
(58) Field of Classification Search ............. 210/232, 210/236, 238, 251, 282, 287, 288, 289, 438, 210/450, 460
See application file for complete search history.

(56) References Cited

U.S. PATENT DOCUMENTS

| | | | |
|---|---|---|---|
| 3,675,777 A * | 7/1972 | Heskett et al. ............ 210/232 |
| 4,933,080 A | 6/1990 | Rundzaitis et al. |
| 5,320,752 A * | 6/1994 | Clack et al. ............... 210/282 |
| 6,562,142 B2 * | 5/2003 | Barger et al. ............... 134/6 |
| 6,571,960 B2 * | 6/2003 | Williamson et al. ........ 210/420 |
| 2002/0005379 A1 | 1/2002 | Williamson et al. ..... 210/433.1 |
| 2002/0144712 A1 | 10/2002 | Barger et al. ............... 134/6 |
| 2003/0034051 A1 | 2/2003 | Barger et al. |

FOREIGN PATENT DOCUMENTS

CH    661 306 A5   7/1987
WO    WO 01/96036 A   12/2001

* cited by examiner

*Primary Examiner*—Christopher Upton
(74) *Attorney, Agent, or Firm*—Jeffrey V. Bamber; Amy I. Ahn-Roll

(57) ABSTRACT

A sprayer purifier cartridge system is disclosed. In one non-limiting embodiment, the sprayer purifier cartridge system includes a sprayer for spraying water and a purifier cartridge for purifying water. In this embodiment, the sprayer has a receiving structure for the purifier cartridge, and the cartridge is attachable to the receiving structure of the sprayer. In this embodiment, one of the sprayer and the purifier cartridge comprises a structure having at least one opening therein. This opening is at least partially surrounded by a material that has flexibility. The other of the sprayer and the purifier cartridge has at least one hollow protrusion that fits into the at least one opening to permit the water to flow in at least one direction between the sprayer and purifier cartridge. The cartridge is attachable to the sprayer to form a seal between the cartridge and the sprayer.

15 Claims, 3 Drawing Sheets

SPRAYER PURIFIER CARTRIDGE SYSTEM

FIELD OF THE INVENTION

The present invention relates to a sprayer purifier cartridge system.

BACKGROUND OF THE INVENTION

Sprayers of various types are known. In some cases, sprayers have a filter or other type of purifier associated therewith. The search for improved systems for associating purifiers with sprayers has continued.

SUMMARY OF THE INVENTION

This invention relates to a sprayer purifier cartridge system. There are numerous non-limiting embodiments of the present invention.

In one non-limiting embodiment, the sprayer purifier cartridge system comprises a sprayer for spraying water and a purifier cartridge for purifying water. In this embodiment, the sprayer has a receiving structure for the purifier cartridge, and the cartridge is attachable to the receiving structure of the sprayer. In this embodiment, one of the sprayer and the purifier cartridge comprises a structure having at least one opening therein, which opening is at least partially surrounded by a material that has flexibility. The other of the sprayer and the purifier cartridge comprises at least one hollow protrusion that fits into the at least one opening to permit the water to flow in at least one direction between the sprayer and purifier cartridge. The cartridge is attachable to the sprayer and forms a seal between the cartridge and the sprayer.

Numerous other embodiments are also possible, including, but not limited to those described in the following detailed description.

The present invention will become more readily apparent when considered in reference to the following description and when taken in conjunction with the accompanying drawings.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings, in which:

DETAILED DESCRIPTION OF THE INVENTION

This invention relates to a sprayer purifier cartridge system.

Figure 1:
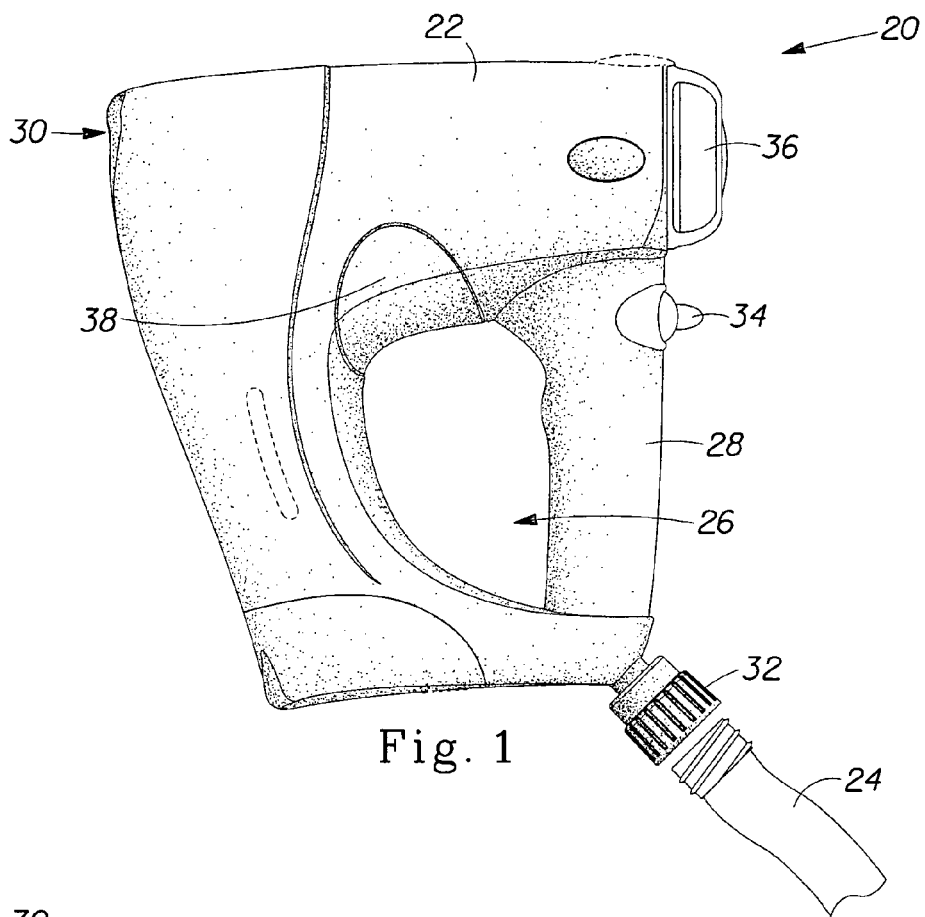
FIG. 1 is a side view of one non-limiting embodiment of a sprayer that may comprise the sprayer purifier cartridge system.

FIG. 1 shows one embodiment of a sprayer 20 comprising the sprayer purifier cartridge system. This sprayer 20 is an ergonomically-designed, hand-held hose end sprayer. It should be understood that the sprayer 20 shown in FIG. 1 has a unique configuration, and that the sprayer purifier cartridge system is not limited to use with a sprayer having such a configuration. The sprayer purifier cartridge system can be used with sprayers having any suitable configuration.

The sprayer 20 comprises a housing or structure 22. Preferably, in the embodiment shown, water flows through the housing 22 when the sprayer 20 is connected to a hose 24 and is in use. The housing 22 has a generally centrally located opening 26 and a handle 28 for gripping by a user. The sprayer 20 further comprises at least one spray nozzle 30 that is operatively connected to the housing 22, and a hose connection (or simply "connection") 32 for the hose 24. The sprayer 20 may also comprise an on/off switch 34, a flow selector 36, and a compartment 38 for a composition to be dispensed (such as a cleaning composition).

Figure 2:
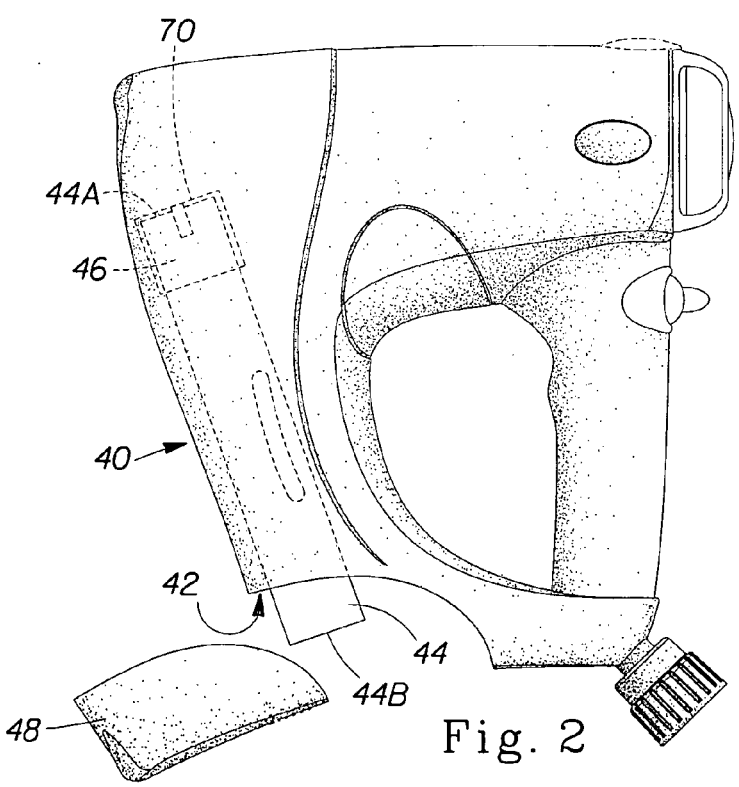
FIG. 2 is a side view of the sprayer similar to FIG. 1 which shows the door to the purifier cartridge compartment removed, and the purifier cartridge system in dashed line.

FIG. 2 shows that in this embodiment, the sprayer purifier cartridge system 40 comprises a compartment 42 in the sprayer 20 for a purifier, and a purifier, such as purifier cartridge 44. The sprayer purifier cartridge system 40 also comprises a receiving structure 46 for the purifier cartridge 44. The sprayer 20 may also comprise a door 48 for the compartment 42 for the purifier. The door 48 may have a clip on one end and a snap closure on the other end to permit easy access to the purifier cartridge 44. It should be understood, however, that in other embodiments the sprayer purifier cartridge system 40 need not include a compartment 42 in the sprayer for the purifier cartridge 44. In such other embodiments, the purifier cartridge 44 may reside at least partially, or entirely, outside of the sprayer 20.

Figure 3:
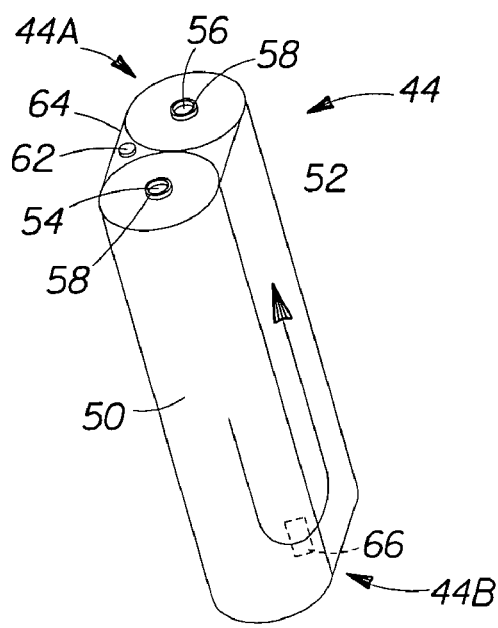
FIG. 3 is a perspective view of one non-limiting embodiment of a purifier cartridge.

FIG. 3 shows one non-limiting embodiment of a purifier cartridge 44. The purifier cartridge 44 can be in any suitable configuration. The purifier cartridge 44 has two ends comprising an upper end 44A and a lower end 44B. As shown in FIG. 2, the upper end 44A is the uppermost portion of the purifier cartridge 44 when the purifier cartridge 44 is inserted into the sprayer 20. The purifier cartridge 44 in the embodiment shown in the drawings is generally comprised of two side-by-side compartments. The compartments comprise cylindrical portions, and the cartridge 44 is more specifically is in the form of a structure comprised of two cylindrical portions 50 and 52 that are joined together along their axes to form a compound cylindrical structure with a cross-section that resembles the figure "8". The diameters of the cross-sections of these two cylindrical portions can be the same, or different.

The purifier cartridge 44 shown in FIG. 3 has an inlet, such as inlet opening 54 and an outlet, such as outlet opening 56. The inlet opening 54 and the outlet opening 56 can be located on opposite ends of the purifier cartridge, or on the same end of the purifier cartridge. In this particular embodiment, the inlet and outlet openings 54 and 56 are both located on the same end of the purifier cartridge, the upper end 44A. When the purifier cartridge 44 is in use, water flows in the inlet opening 54 into first cylindrical portion 50. Water then flows from the first cylindrical portion 50 through a channel 66 connecting the first and second cylindrical portions, to the second cylindrical portion 52. Water exits the purifier cartridge 44 at the outlet opening 56. The inlet and outlet openings can be of any suitable size and shape, and when they are located on the same end of the purifier cartridge 44, they can be spaced any suitable distance apart. In this particular embodiment, the inlet and outlet 54 and 56 comprise circular openings that have a diameter of about 5/16 inch (about 9 mm). The centers of the inlet and outlet openings 54 and 56 are spaced about 1:5 inches (about 38 mm) apart.

The portion of the purifier cartridge 44 that defines the inlet and outlet openings 54 and 56 further comprises raised rings 58 that at least partially surround the inlet and outlet openings 54 and 56. The raised rings 58, in the embodiment shown, are in the configuration of truncated cones. FIG. 5 shows the configuration of one of the openings, such as the inlet opening 54, in greater detail. As shown in FIG. 5, the portion of the purifier cartridge 44 that defines the inlet and outlet openings 54 and 56 also comprises a material or portion 60 thereof that has flexibility when it is contacted by the cylindrical exterior walls 76A of a protrusion 76 on the mating receiving structure 70 shown in FIG. 4.

In the embodiment shown in FIG. 5, the flexible material 60 comprises a portion of the purifier cartridge 44 shell or housing that at least partially surrounds the inlet opening 54. In this embodiment, this portion of the cartridge 44 shell that is flexible is thinner than the portions of the cartridge shell that are outboard (spaced further away from the inlet opening 54) of the flexible portion 60. This flexible portion 60 is also angled downwardly and inwardly toward the center of the inlet opening 54. The flexible material 60 can surround any suitable portion of the inlet opening 54. In certain embodiments, the flexible material 60 completely surrounds the inlet opening 54. This will allow the flexible material 60 to form a leak-proof seal with the walls 76A of the protrusion 76 of the mating receiving structure 70. Forming the flexible portion 60 out of a portion of the cartridge 44 shell provides the advantage that a seal can be formed without adding a separate gasket to the cartridge 44. Another way to form the flexible portion 60 would be to use a two (or more) "shot" molding process in which one material is used to mold the cartridge shell, and a material that is more flexible after molding is used in a second step of the molding process to form the flexible portion 60. Of course, in other embodiments, a gasket can be used to form this seal. All of the same features can be applied to the outlet opening 56.

The purifier cartridge 44 can also comprise an insertion aid to ensure that the cartridge 44 is properly inserted into the receiving structure of the sprayer 20. An insertion aid may be particularly desirable when the cartridge is symmetrical, and a user could inadvertently insert it incorrectly into the receiving structure. Any suitable type of insertion aid can be used for this purpose. In the embodiment shown in FIG. 3, the insertion aid comprises a hole 62 in a portion of the cartridge 44. More specifically, in this embodiment, the insertion aid comprises a hole in the web 64 that connects the two cylindrical portions 50 and 52 of the cartridge 44. This hole 62 can slip over a post 82 on the sprayer 20, such as that shown in FIG. 4 on the receiving structure 70 of the sprayer.

The purifier cartridge 44 can be permanent or replaceable. The purifier cartridge 44 can be inserted into and removed from the sprayer housing 22 through the opening 42 in the lower portion of the sprayer 20. The purifier cartridge 44 can comprise any suitable type of purifying material. In one non-limiting embodiment, the purifier cartridge 44 comprises an ion exchange resin medium. The ion exchange resin medium may have any of the properties described in U.S. Pat. No. 6,562,142 B2 issued to Barger, et al.

Figure 4:
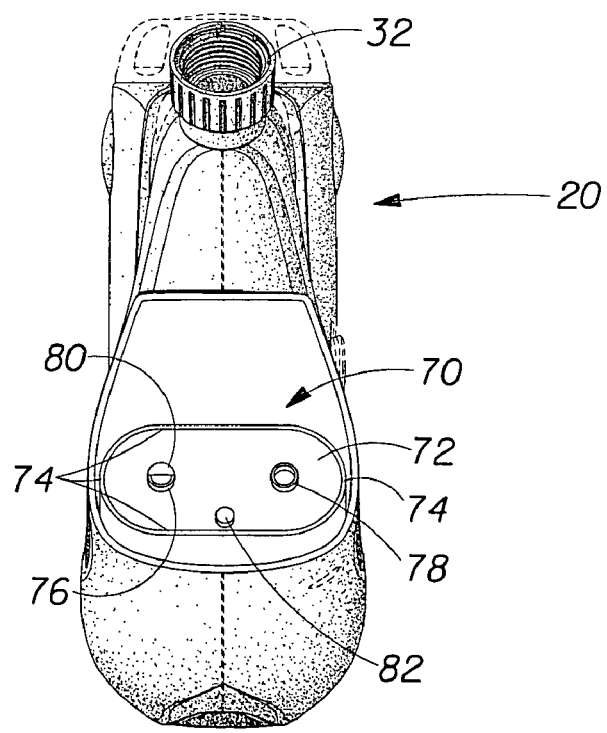
FIG. 4 is a bottom view of the sprayer shown in FIG. 2 which shows the receiving structure for the purifier cartridge.
Figure 5:
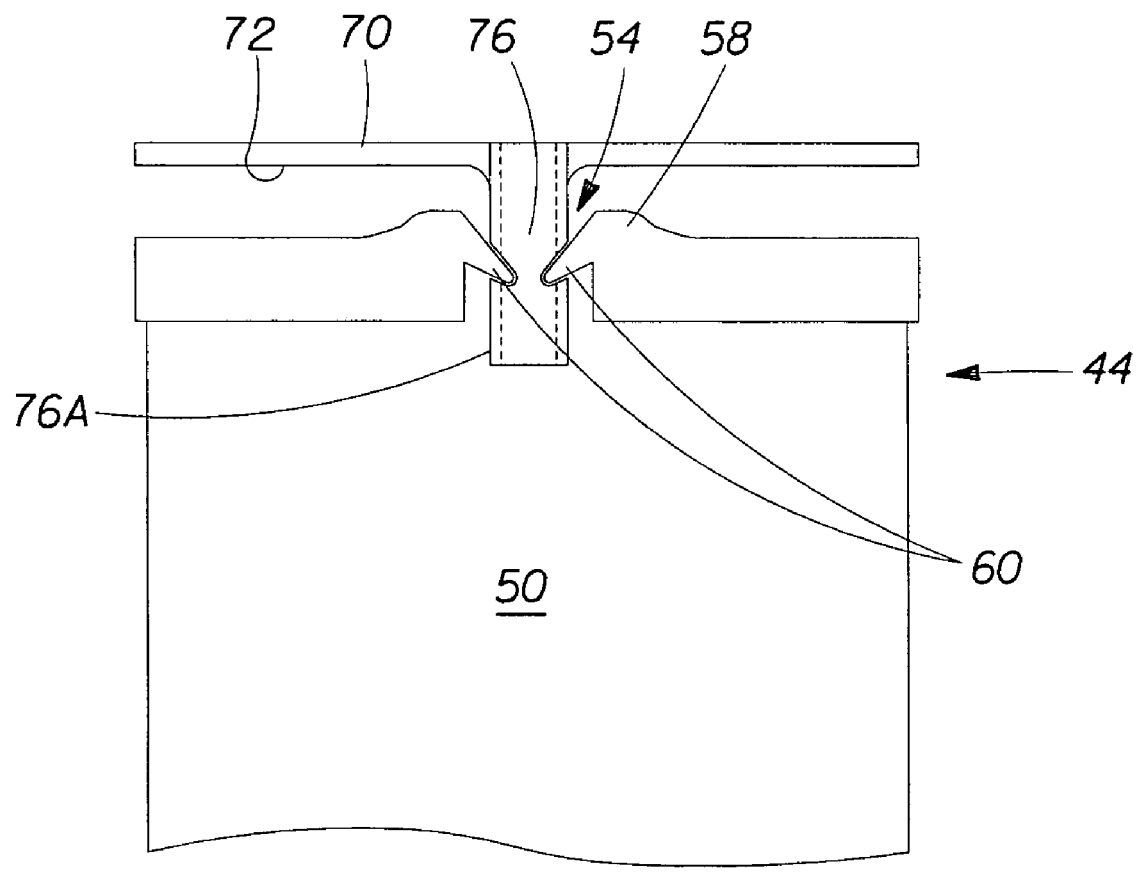
FIG. 5 is a fragmentary schematic side view which shows the seal formed between the purifier cartridge and the receiving structure for the same.

FIG. 4 shows the receiving structure 70 for the purifier cartridge 44. The receiving structure 70 can comprise any suitable structure that is capable of receiving the purifier cartridge 44 and having the purifier cartridge 44 connect to the receiving structure. In the embodiment shown in FIG. 4, the receiving structure 70 comprises a base, such as a base plate 72, optional side walls 74, a hollow inlet protrusion 76, and a hollow outlet protrusion 78. The inlet protrusion 76 may have a cover 80 on the same to deflect water so that water does not inadvertently spray out of the inlet protrusion 76. The receiving structure 70 may also comprise a post 82 for engaging the hole 62 in the cartridge 44 to ensure that it is inserted properly. The components of the receiving structure 70 can be formed out of a single piece of material, or of more than one piece of material. In one embodiment, the components of the receiving structure 70 are formed of a single molded piece of plastic.

To use the sprayer 20, the door 48 is removed from the sprayer housing, and the upper end 44A of the purifier cartridge 44 is inserted into the receiving structure 70 so that the hole 62 in the web on the cartridge slips over the post 82 on the receiving structure 70. When the purifier cartridge 44 is inserted in this manner, the inlet opening and the outlet opening, 54 and 56 will fit over the hollow inlet post and outlet post, 76 and 78, respectively, and will form a water-tight seal with the exteriors walls thereof as shown in FIG. 5. The door 48 to the purifier cartridge compartment is then replaced, and the sprayer can be used to spray: water, a mixture of water and a cleaning composition, or purified water. After the ion exchange resin in the purifier cartridge is exhausted, the door 48 to the cartridge compartment is opened, and the cartridge 44 is removed and replaced with a new cartridge.

Numerous other embodiments are possible. A few of these are as follows. In other embodiments, for example, the positions of the hollow protrusions and the openings on the system could be reversed so that the protrusions would be on the cartridge 44 and the openings could be in the receiving structure on the sprayer. In addition, the positions of the components of the insertion aid could be reversed so that the post is on the cartridge 44 and the hole for the same is in the receiving structure on the sprayer.

In these or other embodiments, a different mechanism could be used as an insertion aid. In one other embodiment, for instance, a combination of longitudinally-oriented ribs and grooves could be provided on any combination of the exterior of the cartridge 44 and the interior of the sprayer to ensure that the cartridge 44 is properly inserted into the receiving structure of the sprayer 20. In these or other embodiments, the cartridge 44 could be held in place by some mechanism other than the door 48. In one other embodiment, for instance, the cartridge 44 can be held in place by one or more latches. Such latch(es) could be located at any suitable location, including, but not limited to at the bottom end 44B of the cartridge 44, or at the top end 44A of the cartridge. The latch(es) at the top end 44A of the cartridge 44 could, for example engage with the web 64 that connects the two cylindrical portions 50 and 52 of the cartridge 44.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. In addition, while the present invention has been described in connection with certain specific embodiments thereof, it is to be understood that this is by way of illustration and not by way of limitation and the scope of the invention is defined by the appended claims which should be construed as broadly as the prior art will permit.

What is claimed is:

1. A sprayer purifier cartridge system comprising:
   a sprayer for spraying water, wherein said sprayer has a receiving structure including at least two hollow protrusions; and
   a purifier cartridge containing a substance for purifying water, said cartridge being attachable to said receiving structure of said sprayer,
   wherein said purifier cartridge comprises an outer surface with at least two openings therein and at least two raised rings extending upwardly from said outer surface, wherein said rings respectively at least partially surround said two openings and said rings are configured to guide said receiving structure protrusions toward said openings, wherein a sealing portion integral with each of said rings extends radially inward toward the center of each of said openings, and each sealing portion is thinner and more flexible than said rings disposed outwardly thereof, and said at least two hollow protrusions respectively fit into said at least two openings to permit water to flow in at least one direction between said sprayer and said purifier cartridge, wherein said cartridge is attachable to said sprayer and said sealing portions form a seal between said cartridge and said sprayer, and said cartridge is disposable.

2. The sprayer purifier cartridge system of claim 1 wherein said sprayer comprises a housing, and said housing has a recess for insertion of at least a portion of said purifier cartridge.

3. The sprayer purifier cartridge system of claim 1 wherein said cartridge has two ends comprising a first end and a second end, wherein said two openings are located on the same end of said cartridge.

4. The sprayer purifier cartridge system of claim 1 wherein said substance for purifying water comprises at least one ion exchange resin.

5. The sprayer purifier cartridge system of claim 1 wherein said cartridge comprises two side-by-side compartments.

6. The sprayer purifier cartridge system of claim 5 wherein said side-by-side compartments have a cylindrical configuration and an opening therebetween for transmitting water between said compartments.

7. The sprayer purifier cartridge system of claim 1 wherein said cartridge comprises an insertion aid.

8. The sprayer purifier cartridge system of claim 7 wherein said insertion aid comprises a hole in said cartridge that mates with a pin on said sprayer.

9. The sprayer purifier cartridge system of claim 1 wherein said openings have a diameter of about 5/16 inch.

10. The sprayer purifier cartridge system of claim 9 wherein the centers of said inlet and said outlet openings are spaced about 1.5 inches apart.

11. The sprayer purifier cartridge system of claim 1 wherein said at least two hollow protrusions comprise a pair of spaced apart hollow posts.

12. The sprayer purifier cartridge system of claim 11 wherein said at least two raised rings of said purifier cartridge respectively fit over said hollow posts, wherein the flexible material that at least partially surrounds said two openings forms a leak-proof seal with said hollow posts.

13. The sprayer purifier cartridge system of claim 1 wherein said seal between said cartridge and said sprayer is formed without adding a separate gasket to said sprayer purifier cartridge system.

14. The sprayer purifier cartridge system of claim 1 wherein said hollow protrusions include at least one indentation configured to sealingly receive the respective sealing portion when the hollow protrusions are fit into the respective openings.

15. A sprayer purifier cartridge system comprising:
   a sprayer for spraying water and a purifier cartridge, wherein said sprayer has a recess for insertion of at least a portion of said purifier cartridge and a receiving structure for said purifier cartridge; and
   said purifier cartridge containing a substance for purifying water, said cartridge having two ends comprising a first end and a second end, an inlet and an outlet, and said inlet and outlet are located on the same end of said cartridge, said cartridge being attachable to the receiving structure of said sprayer,
   wherein said purifier cartridge comprises an outer surface with at least two openings therein and at least two raised rings extending upwardly from said outer surface, wherein said rings respectively at least partially surround said two openings and said rings are configured to guide said receiving structure protrusions toward said openings, wherein a sealing portion integral with each of said rings extends radially inward toward the center of each of said openings, and each sealing portion is thinner and more flexible than said rings disposed outwardly thereof, and said at least two hollow protrusions respectively fit into said at least two openings to permit water to flow in at least one direction between said sprayer and said purifier cartridge, wherein said cartridge is attachable to said sprayer and said sealing portions form a seal between said cartridge and said sprayer.

* * * * *